United States Patent [19]

Fukui

[11] Patent Number: 5,440,212
[45] Date of Patent: Aug. 8, 1995

[54] CONTROL APPARATUS FOR VIBRATION DRIVEN MOTOR

[75] Inventor: Hajime Fukui, Tokyo, Japan

[73] Assignee: Canon Kabushiki Kaisha, Tokyo, Japan

[21] Appl. No.: 170,838

[22] Filed: Dec. 21, 1993

[30] Foreign Application Priority Data

Dec. 24, 1992 [JP] Japan .................. 4-344347

[51] Int. Cl.[6] .............................. H01L 41/08
[52] U.S. Cl. ............................ 318/116; 310/316
[58] Field of Search ............ 310/316, 317, 323; 318/116

[56] References Cited

U.S. PATENT DOCUMENTS

| | | | |
|---|---|---|---|
| 4,935,659 | 6/1990 | Naka et al. | 310/323 X |
| 4,990,835 | 2/1991 | Ohnishi et al. | 318/116 |
| 5,254,899 | 10/1993 | Suzuki et al. | 310/323 |
| 5,285,134 | 2/1994 | Kataoka | 318/116 |

FOREIGN PATENT DOCUMENTS

64-60273  3/1989  Japan .
0258510  2/1990  Japan .

*Primary Examiner*—Mark O. Budd
*Attorney, Agent, or Firm*—Fitzpatrick, Cella, Harper & Scinto

[57] ABSTRACT

The present invention relates to an apparatus for sequentially controlling a plurality of vibration driven motors by a microcomputer. The present invention provides a control apparatus for constantly monitoring a vibration state of each motor, and when a motor is close to a resonance state, preferentially controlling the motor in a state near resonance by interrupt processing even if the computer is currently controlling another motor.

9 Claims, 11 Drawing Sheets

CONTROL APPARATUS FOR VIBRATION DRIVEN MOTOR

BACKGROUND OF THE INVENTION

1. Field of the Invention

The present invention relates to a driving control apparatus for a plurality of vibration driven (vibration wave) motors, which integrally controls the plurality of vibration driven motors (vibration wave motors).

2. Related Background Art

Conventionally, as a driving control apparatus for a plurality of vibration driven (vibration wave) motors, an apparatus as disclosed in Japanese Laid-Open Patent Application No. 64-60273 is known. This conventional apparatus has a frequency setting means for switching the frequency of a driving AC signal for a plurality of vibration driven (vibration wave) motors in accordance with each individual vibration driven motor and a distribution driving circuit for applying the driving signal to an arbitrarily selected vibration driven motor.

An apparatus disclosed in Japanese Laid-Open Patent Application No. 2-58510 comprises a plurality of detecting means for respectively detecting the vibration states of a plurality of vibration driven motors to stably drive them. The apparatus also has a switching means for feed back a plurality of signals generated from the detecting means to the CPU, thereby controlling the individual vibration driven motors.

In the conventional apparatus described above, however, the driving frequencies of the vibration driven motors are sequentially controlled by the CPU. For this reason, when the vibration state of a vibration driven motor suddenly varies from the resonance state due to a variation in load or the like, control is not performed in time. In this case, the vibration driven motor may deviate from the resonance frequency and suddenly stop.

SUMMARY OF THE INVENTION

One aspect of the application is to provide an improved driving control apparatus for a vibration driven motor, which solves the above-mentioned problem in the prior art, and can quickly restore a normal operation state without stopping the motor even when one of a plurality of vibration driven motors is set in an abnormal state.

One aspect of the application is to provide, under the above object, an apparatus in which when an abnormal state of one of the vibration driven motors is detected, the frequency of a driving signal for the vibration driven motor set in the abnormal state is controlled in preference to the frequencies of driving signals for other vibration driven motors.

One aspect of the application is to provide, under the above object, an apparatus in which when respective motors (actuators) are sequentially controlled by a control circuit, if the driven state of a predetermined motor reaches a predetermined driven state, e.g., a resonance state or state near resonance, control is shifted by interrupt processing such that the control circuit preferentially controls this motor, thereby preventing the motor from being set in an abnormal state.

Other objects of the present invention will be apparent from the following description of the embodiments when taken in conjunction with the accompanying drawings.

BRIEF DESCRIPTION OF THE DRAWINGS

FIG. 7 is comprised of FIG. 7A and FIG. 7B illustrating flow charts showing details of the control operation in the first embodiment;

DETAILED DESCRIPTION OF THE PREFERRED EMBODIMENTS

An embodiment of the present invention will be described below with reference to the accompanying drawings. <First Embodiment>

Figure 1:
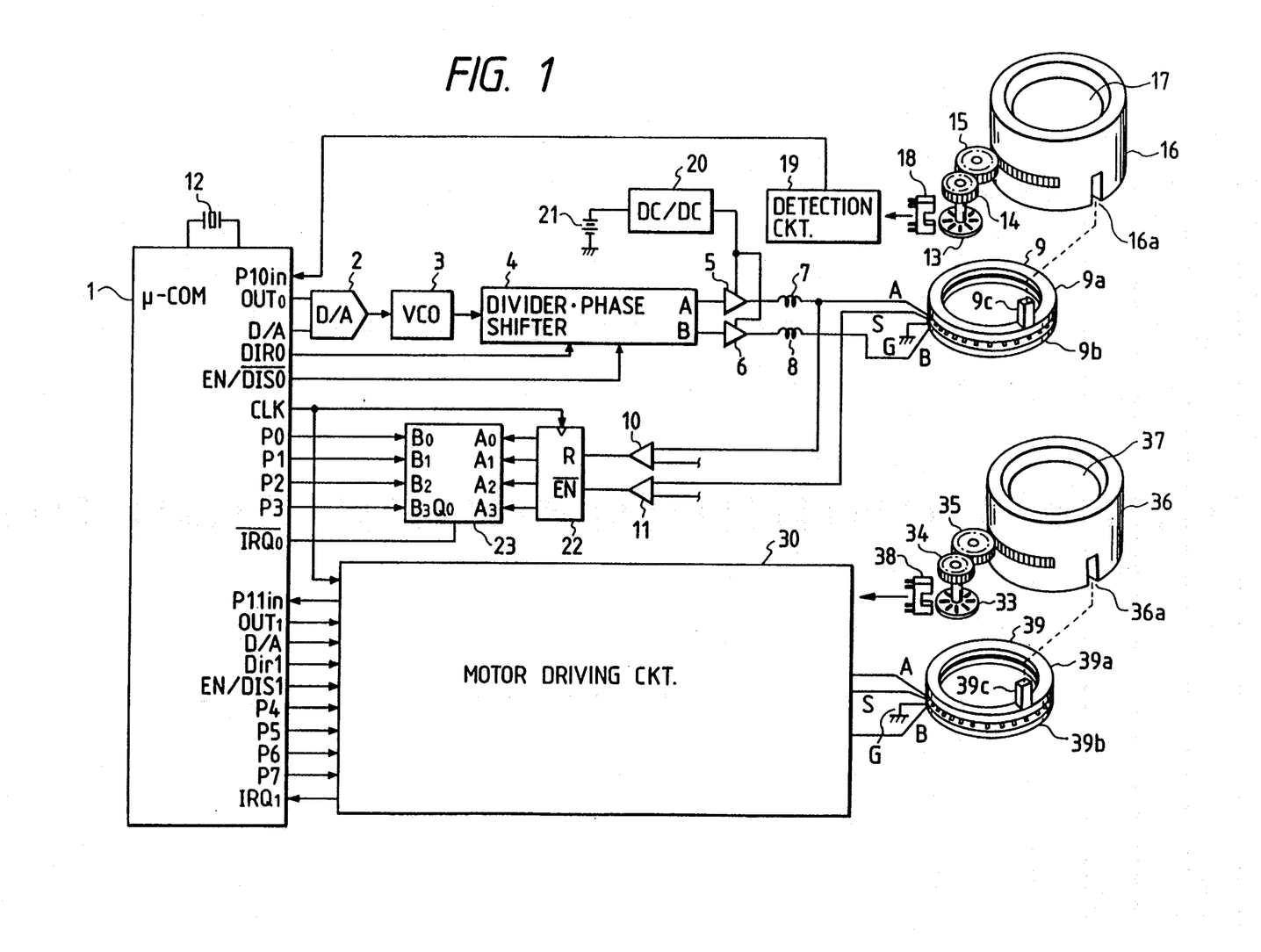
FIG. 1 is a schematic view showing the arrangement of a lens barrel having a driving control apparatus for a vibration wave motor according to the first embodiment of the present invention.

FIG. 1 is a schematic view showing an electric arrangement and a mechanical structure in a lens barrel incorporating a vibration wave motor having a driving control apparatus for a vibration wave motor according to the first embodiment of the present invention.

The arrangement shown in FIG. 1 has a microcomputer 1 and a D/A converter 2.

A voltage-controlled oscillator (VCO) 3 generates a periodic voltage in accordance with an output voltage from the D/A converter 2.

A divider-phase shifter 4 divides the periodic voltage from the VCO 3 and outputs a periodic voltage having a $\pm \frac{1}{2}\pi$ phase difference.

Power amplifiers 5 and 6 amplify the periodic voltage from the divider-phase shifter 4 to a voltage and a current value which can drive a vibration wave motor 9.

The electric arrangement has matching coils 7 and 8, and the vibration wave motor 9 has a rotor 9a, a stator 9b, and a key 9c for transmitting the rotational force to a lens barrel 16. Voltage comparators 10 and 11 convert A- and S-phase signals into digital signals and output them to a counter 22.

A quartz oscillator 12 generates a reference clock to be supplied to the microcomputer 1.

The constituent elements 22 and 23 constitute a phase detection circuit. The constituent element 22 is a 4-bit counter connected to a clock output terminal CLK of the microcomputer 1.

If the driving frequency of the vibration wave motor is 32 kHz, the 4-bit counter counts the clock pulses to measure the phase between the A- and S-phases at an angular interval of 11.25° (=) such that a clock having a frequency 32 times that of the driving frequency, i.e., a 1-MHz clock from the quartz oscillator, is frequency-divided.

A counter reset input terminal R of the counter 22 cancels counter reset when an input to this terminal is Hi, and resets the counter 22 when an input to this terminal is Lo.

A count enable terminal EN enables the count operation when an input to this terminal is Lo, and disables the count operation when an input to this terminal is Hi. The 4-bit data as the measurement result from the counter 22 is input to terminals A0 to A3 of a known magnitude comparator 23.

On the other hand, other input terminals of the magnitude comparator 23 are connected to output terminals P0 to P3 of the microcomputer 1. The magnitude comparator 23 compares the two inputs. When B0 to B3>A0 to A3, an output Q0 from the magnitude comparator 23 is Lo. The output Q0 is input to an input terminal IRQ0 of the microcomputer 1 as an interrupt signal.

A pulse plate 13 is fitted on the outer circumferential gear portion of the lens barrel 16 through gears 14 and 15.

The lens barrel 16 has a lens 17. An interrupter 18 detects rotation of the pulse plate 13, i.e., rotation of the vibration wave motor 9. A signal detection circuit 19 for the interrupter 18 amplifies a very small signal from the interrupter 18 to convert it into a digital signal (pulse).

A DC/DC converter 20 generate a voltage required to drive the vibration wave motor 9 from a battery 21.

The arrangement of a vibration wave motor driving circuit 30 in another system is the same as in the above arrangement having the constituent elements 2 to 23, and a detailed description thereof will be omitted.

A pulse plate 33 is fitted on the outer circumferential gear portion of a lens barrel 36 in another system through gears 34 and 35. For example, the lens barrel 16 is a lens barrel for focus-driving, and the lens barrel 36 is a lens barrel for zoom-driving.

The lens barrel 36 has a lens 37. An interrupter 38 detects rotation of the pulse plate 33, i.e., rotation of a vibration wave motor 39.

Figure 2:
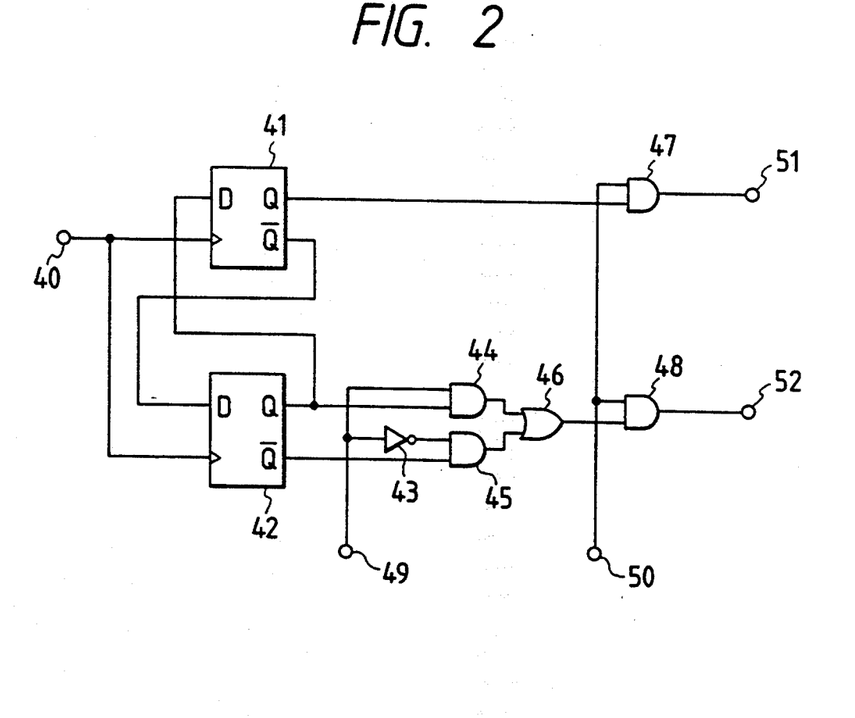
FIG. 2 is a block diagram showing a detailed example of a divider-phase shifter used in the first embodiment shown in FIG. 1.

FIG. 2 shows a detailed example of the circuit of the divider-phase shifter in FIG. 1. This circuit includes D flip-flops 41 and 42, a NAND gate 43, AND gates 44, 45, 47, and 48, and an OR gate 46.

An input terminal 40 receives a four times frequency from the VCO in FIG. 1. A driving direction setting terminal 49 sets the driving direction of the vibration wave motor. A driving enable/disable terminal 50 enables driving of the vibration wave motor when an output from the driving enable/disable terminal 50 is Hi, and disables driving of the vibration wave motor when an output from the terminal is Lo.

The vibration wave motor will be described below with reference to FIG. 3.

Figure 3:
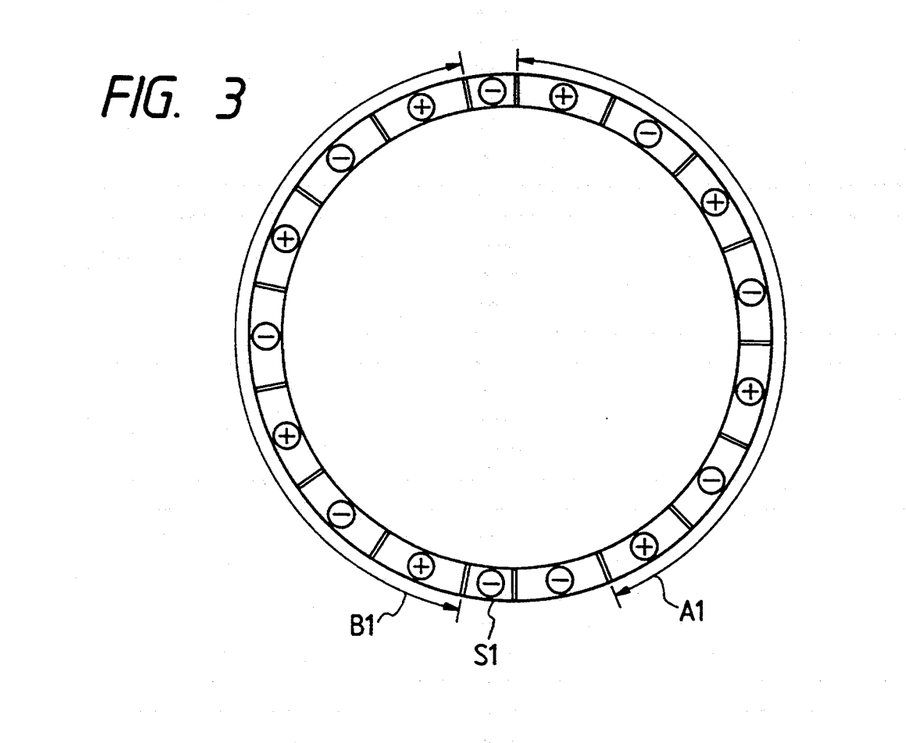
FIG. 3 is a view showing a polarization arrangement in the vibration member of the vibration wave motor.

FIG. 3 is an explanatory view showing the arrangement state of electrostrictive elements arranged on the rear surface of the stator 9b. Referring to FIG. 3, first and second electrostrictive element groups A1 and B1 as electro-mechanical energy converting element groups are arranged on the stator 9b to have the illustrated phase and polarization relationships therebetween. A sensor electrostrictive element S1 as an electro-mechanical energy converting element is arranged at a position phase-shifted by 45° from the first electrostrictive element group A1. These electrostrictive elements may be individually attached to the vibration member, or may be integrally formed by polarization processing.

Referring to FIG. 1, driving electrodes A and B are connected to the first and second electrostrictive element groups. When a periodic voltage is applied to the electrode A via the amplifier 5, and the periodic voltage is applied to the electrode B via the amplifier 6, a traveling vibration wave is generated on the surface of the stator 9b.

A sensor electrode S is connected to the sensor electrostrictive element S1. When the vibration wave is formed on the surface of the stator 9b, the sensor electrode S outputs a periodic voltage in accordance with the state of this vibration wave.

Note that the vibration wave motor has characteristics that the driving voltage to the electrode A and the output voltage from the sensor electrode have a specific phase relationship therebetween in the resonance state. The resonance state is determined by the phase relationship between the first electrostrictive element Group A1 applied with a periodic signal via the electrode A and the sensor electrostrictive element S1. In this embodiment, in a forward rotation state, a resonance state occurs when the phase difference between the signal waveforms of the electrodes A and S becomes 135°; in a reverse rotation state, a resonance state occurs when the phase difference becomes 45°. Also, the phase relationship is shifted as the frequency is shifted from the resonance frequency.

Figure 4:
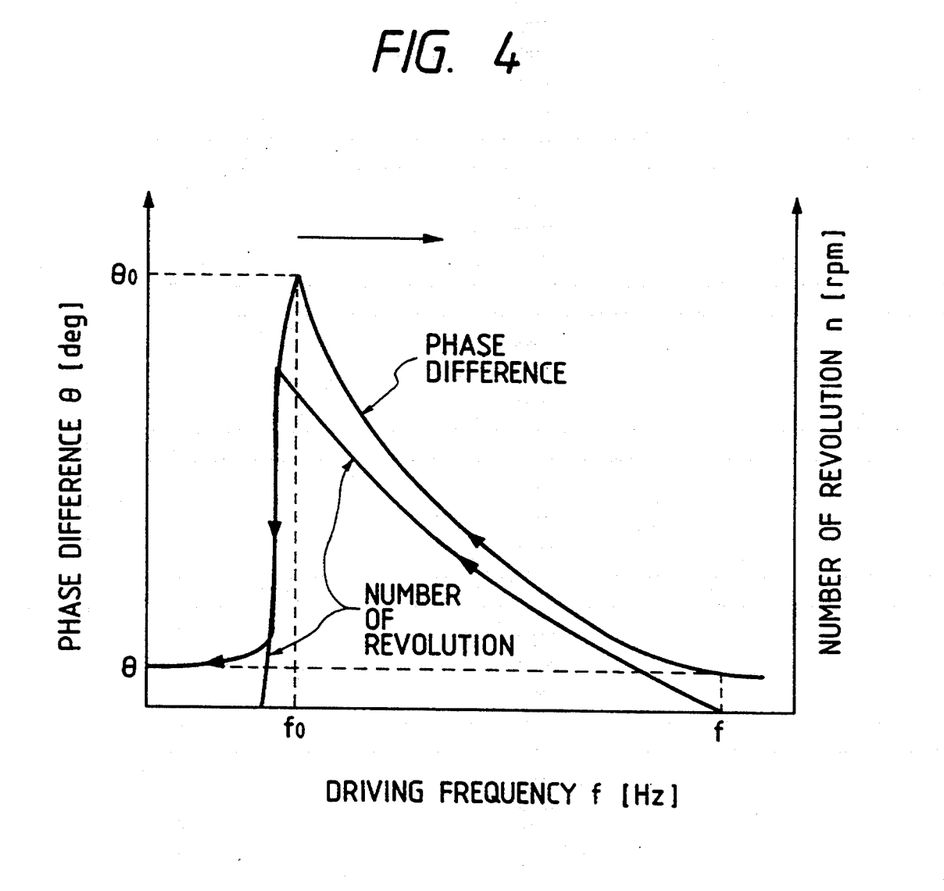
FIG. 4 is a graph showing the relationship between the driving signal, the phase of the vibration state detection signal, and the number of revolution.

FIG. 4 is a graph showing the phase characteristics of the vibration wave motor 9, in which a driving frequency f is plotted along the abscissa, a phase difference θ between the A- and S-phases is plotted along ordinate 1, and a number of revolutions n is plotted along ordinate 2.

Referring to FIG. 4, the phase difference is smaller in the upward direction, the number of revolutions n is higher in the upward direction, and the frequency f is higher in the right direction.

When the driving frequency is scanned from a high frequency to a lower frequency, the vibration wave motor starts to move at an initial frequency fs. As the frequency is further scanned to a lower frequency, the number of revolutions increases, and at the same time, the phase difference θ between the A- and S-phases is reduced. However, when the frequency is lowered to exceed a resonance frequency fo, rotation of the motor is suddenly stopped, and the phase difference $\theta$ also greatly varies. These characteristics are shifted in the left and right directions in accordance with the temperature and the load. Especially, when the load is heavy, these characteristics are shifted in the right direction in FIG. 4.

Operations of the phase detection circuits 22 and 23 will be described below with reference to FIGS. 5A and 5B.

Figure 5A:
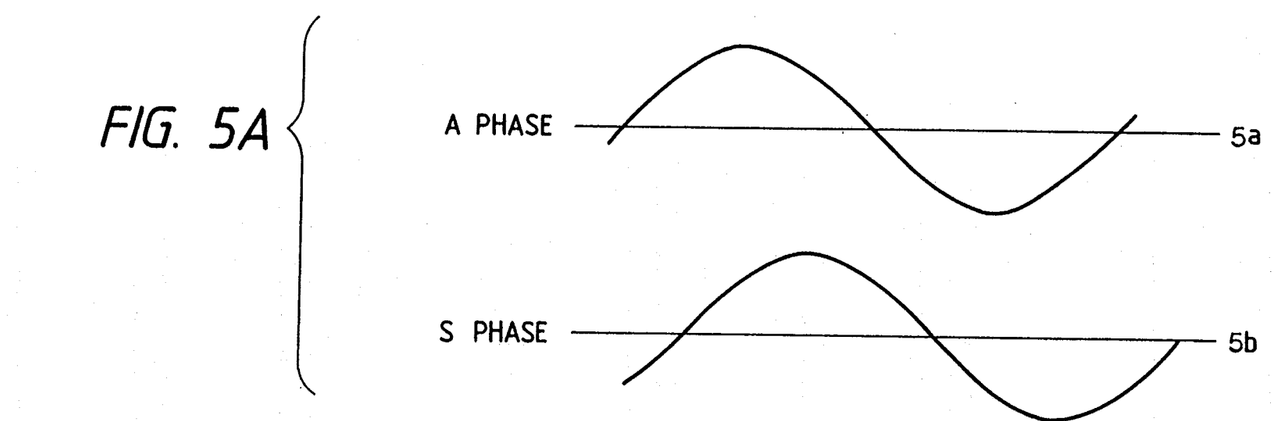
FIG. 5A is a diagram showing the driving signal for the vibration wave motor.

FIG. 5A shows an A-phase output signal 5a and an S-phase output signal 5b.

Figure 5B:
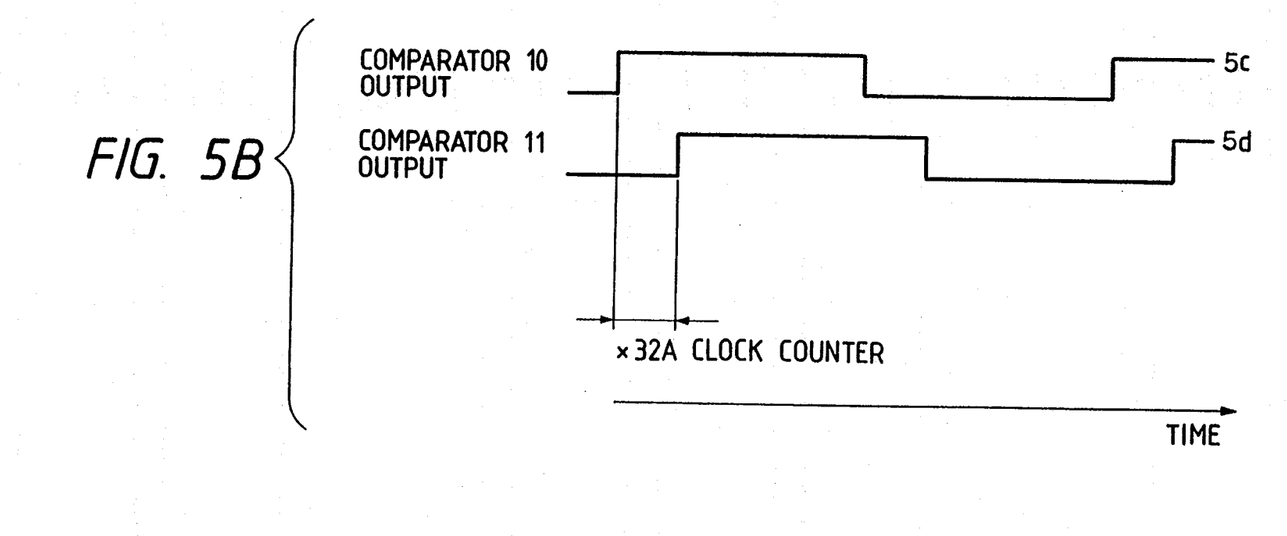
FIG. 5B is a timing chart of the vibration state detection signal and the signal of the phase difference detection circuit of the driving control apparatus.

FIG. 5B shows an output 5c from the comparator 10 in FIG. 1 representing a comparison result of the signal 5a, and an output 5d from the comparator 11 in FIG. 1 representing a comparison result of the signal 5b.

When the output from the comparator 10 is Hi, reset of the counter 22 is canceled, and the counter 22 counts clock pulses from the microcomputer 1. When the output from the comparator 11 is Hi, count by the counter 22 is disabled, and the count value of the clock pulses to this point of time is output to the magnitude comparator 23. For example, when the driving frequency of the vibration wave motor (USM) is 31.25 kHz, and the phase difference between the A- and S-phases is 45°, the count value from the microcomputer for 1 $\mu$sec is measured in accordance with the following equation:

$$COUNT = (1/31.25 \text{ kHz})*(45°/360°)/(1/1000 \text{ kHz}) = 4$$

More specifically, if a binary value 0100 is set at P3 to P0, when the phase difference between the A- and S-phases becomes 45° or less, the output Q0 from the magnitude comparator 23 goes Lo and an interrupt signal to the microcomputer 1 is generated.

An operation programmed in the microcomputer 1 will be described below with reference to FIG. 6.

[Step 601] A value corresponding to a predetermined phase value is set at the terminals P0 to P3 to set a phase relative set value of the magnitude comparator 23. For example, in order to set a phase set value of 45°, a binary value 0100 is set, as described above.

[Step 602] When the driving direction of the vibration wave motor is CCW, a terminal DIR1 of the microcomputer 1 is set to Hi level. When the driving direction of the vibration wave motor is CW, the terminal DIR1 is set to Lo level.

[Step 603] A terminal D/A OUT of the microcomputer 1 is set to a value corresponding to the initial frequency fs.

[Step 604] A terminal EN/DIS0 is set to Hi level to start driving of the vibration wave motor 9.

[Step 605] When the output from the magnitude comparator 23 is Lo, the phase difference between the A- and S-phases is smaller than a predetermined value. In this case, the flow advances to step 608 to decelerate the vibration wave motor. When the output from the magnitude comparator 23 is Hi, the flow advances to step 607 to accelerate the vibration wave motor. Note that when the output from the comparator 23 is Lo, interrupt processing (to be described later) is performed. Step 608 is actually executed after interrupt processing.

[Step 606] The interval of a pulse generated by rotation of the pulse plate 13 is measured. When the pulse width is smaller than a predetermined value, the flow advances to step 608 to decelerate the vibration wave motor. When the pulse width is larger than the predetermined value, the flow advances to step 607 to accelerate the vibration wave motor to a target speed. Note that the pulse interval is detected by inputting a pulse from the detection circuit 19 to an input terminal P10in of the microcomputer.

[Step 607] The frequency is lowered by a predetermined value to accelerate the vibration wave motor. The flow jumps to step 609.

[Step 608] The frequency is raised by a predetermined value to decelerate the vibration wave motor.

[Step 609] The number of pulses of the interrupter, which are input to the input terminal P10IN of the microcomputer 1, is counted. When the count value has not reached a driving target value, the flow returns to step 605. When the count value has reached the driving target value, the flow advances to step 610.

[Step 610] The output terminal EN/DIS0 of the microcomputer 1 is set to Lo level to end driving of the vibration wave motor.

Steps 601 to 610 described above are related to the driving process of the vibration wave motor 9. However, a plurality of vibration wave motors 9 and 39 are controlled by sequentially repeating steps 605 to 609.

More specifically, the first process in steps 605 to 610 is performed to control the motor 9. Thus, for example, when the first process in steps 605 to 610 is finished as in FIG. 7, the process in steps 605' to 610' or 605" to 610" is executed to control the motor 39. Thereafter, the process in steps 605 to 610 or 605''' to 610''' is executed again to control the motor 9. That is, the same process as in the process in steps 605 to 610 is executed to alternately control the motors 9 and 39. In this case, the process in steps 601 to 604 is executed to control the motors 9 and 39 at the same time. In more detail, the motor 9 is controlled in steps 605 to 609, the motor 39 is then controlled in steps 605' to 609', and the motor 9 is controlled in steps 605 to 609 again. When the driving target position is reached during control of the motor 9, control of the motor 9 ends in step 610. In this case, only the motor 39 is then controlled in steps 605" to 610". When control of the motor 39 reaches the target position during execution of steps 605' to 610', only the motor 9 is then controlled in steps 605''' to 610'''.

Figures 7, 7A:
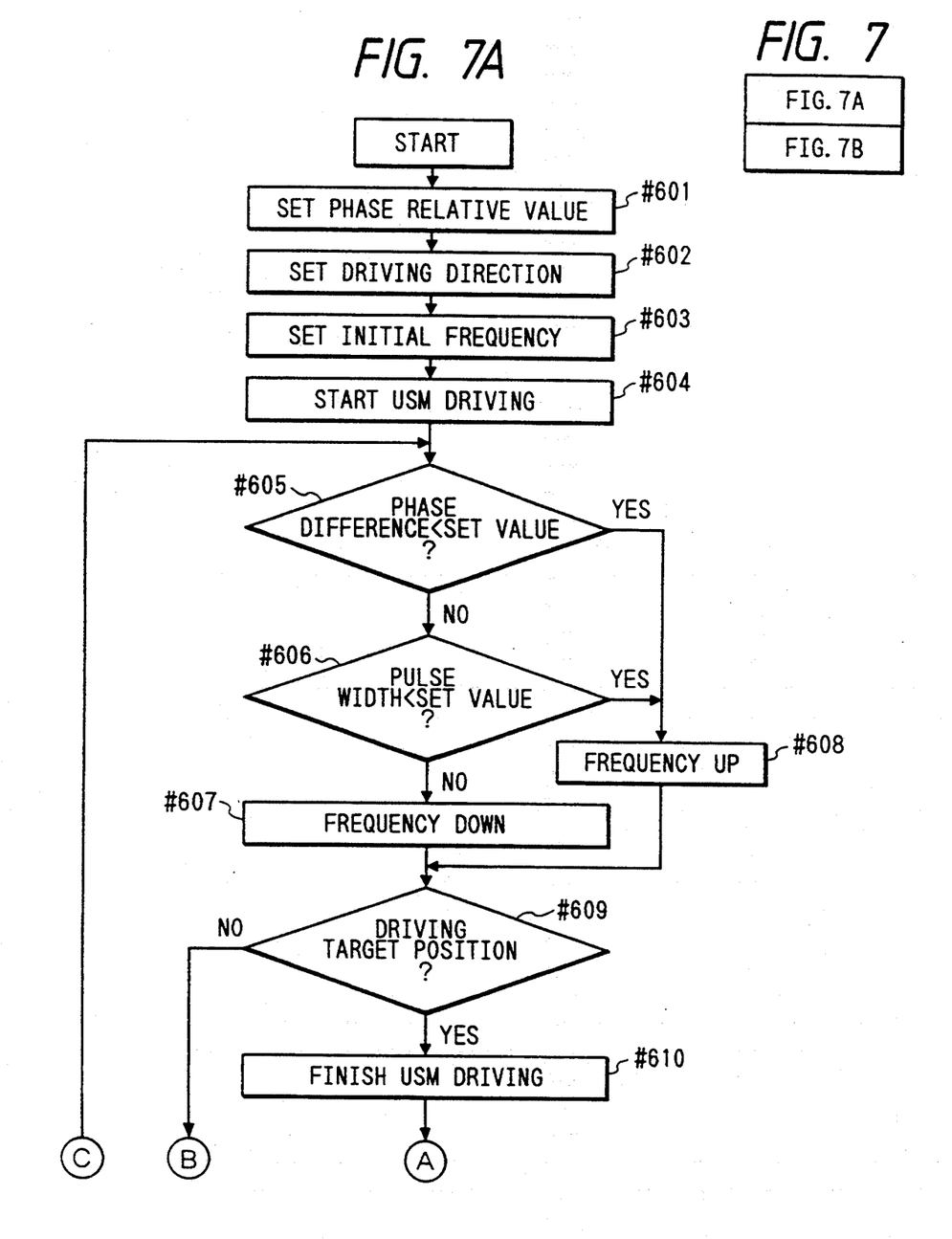

Since steps 605 to 610 and 605''' to 610''' are steps for controlling the motor 9, the terminals P10IN, D/A OUT0, DIR0, EN/DIS0, CLK, P0 to P3, and IRQ0 are selected as I/O ports of the microcomputer 1 in these steps to perform control in each step described above. On the other hand, steps 605' to 610' and 605" to 610" are steps for controlling the motor 39, the terminals P11IN, D/A OUT1, Dir1, EN/DIS1, P4 to P7, IRQ1, and CLK are selected as I/O ports of the microcomputer 1 in these steps to perform control in each step described above.

Interrupt processing performed when the phase difference between the A- and S-phases is smaller than a predetermined value will be described below with reference to FIG. 8.

Figures 6, 8:
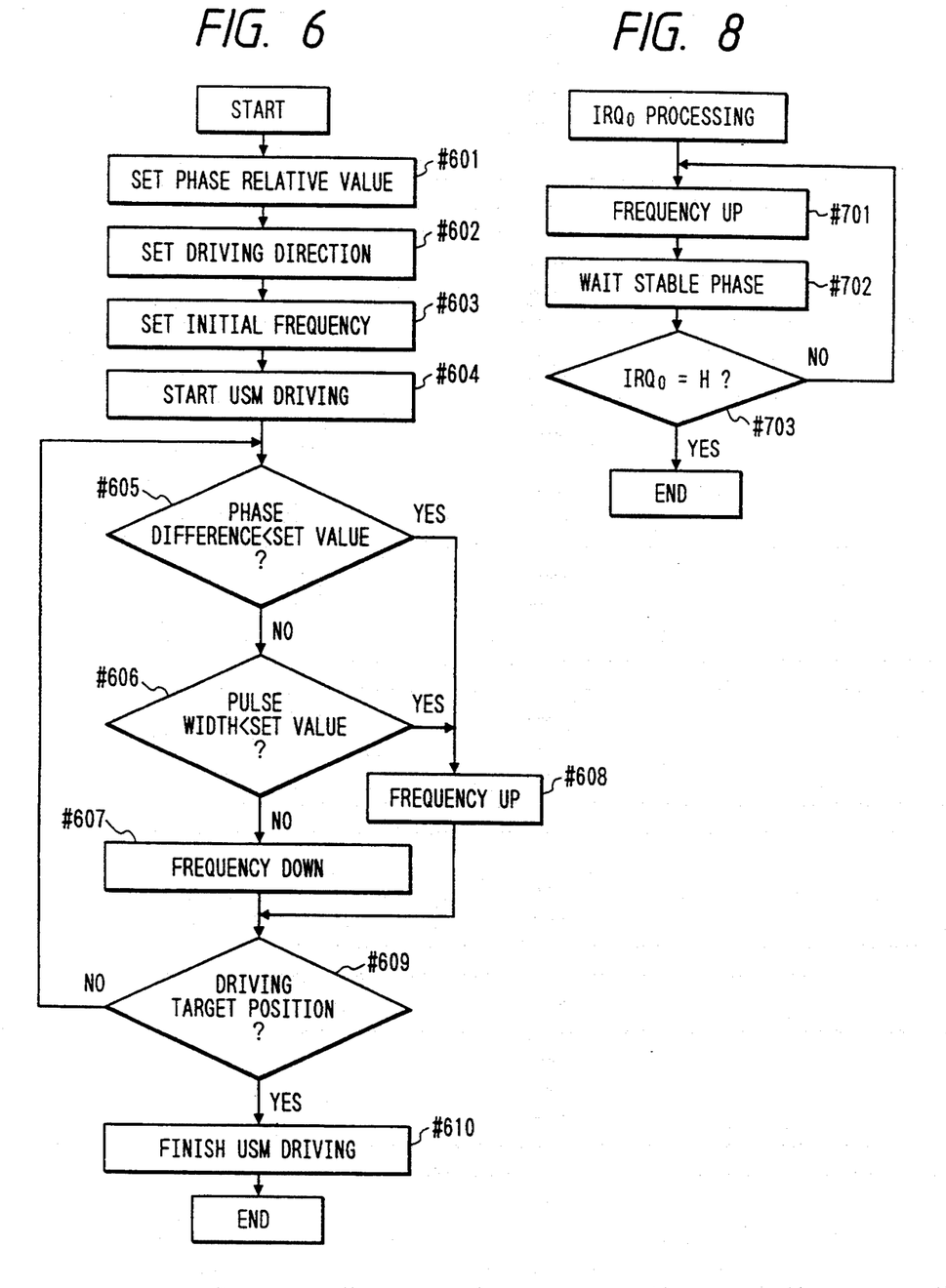
FIG. 6 is a flow chart showing the control operation of the driving control apparatus for the vibration wave motor according to the first embodiment.
FIG. 8 is a flow chart showing the characteristic control operation in the driving control apparatus of the present invention.
Figure 7B:
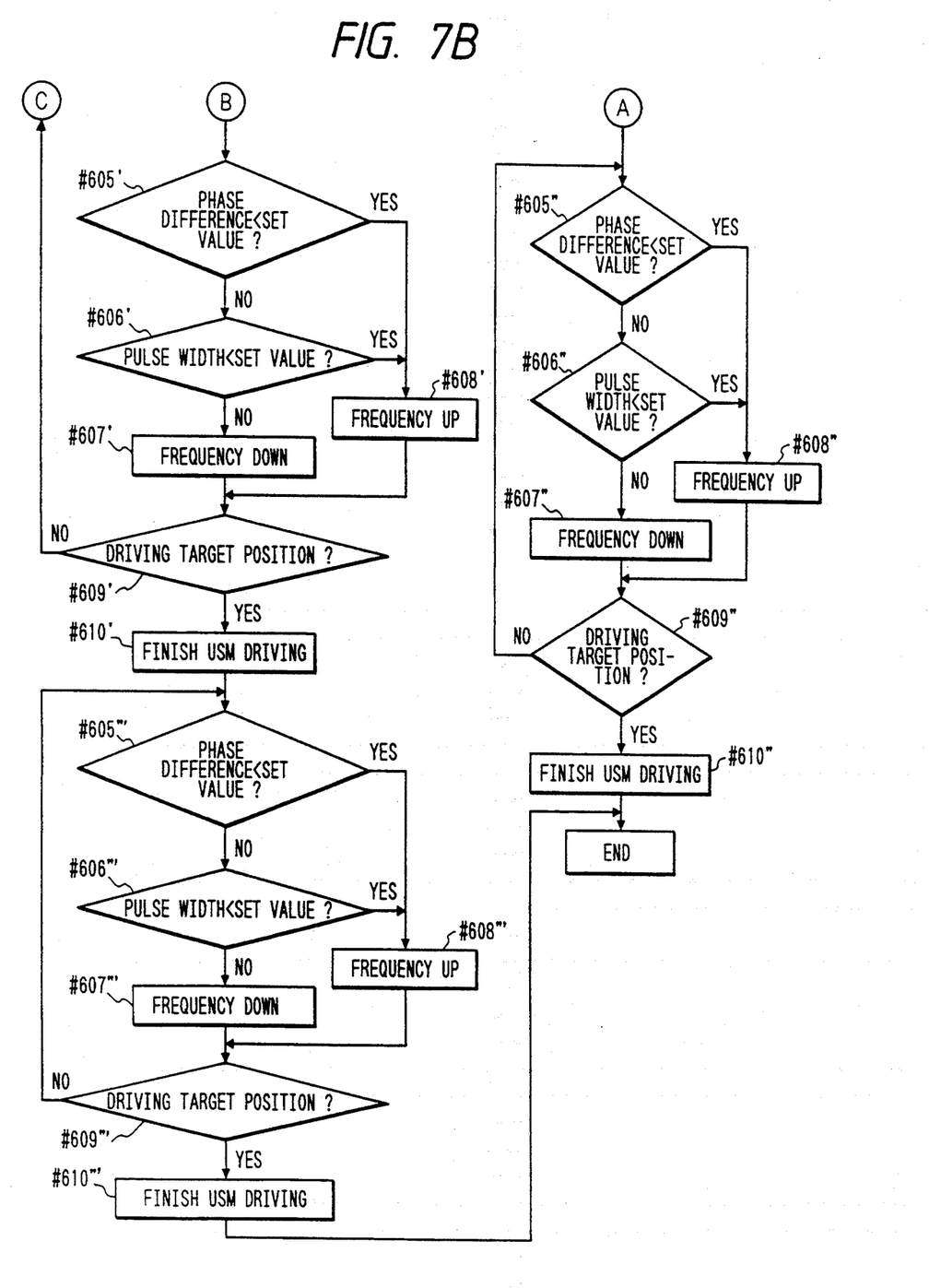

In flow control by the microcomputer 1 in FIG. 6 or 7A and 7B, the microcomputer 1 constantly monitors the input states of the terminals IRQ0 and IRQ1. When an input to the terminal IRQ0 is Lo, interrupt processing in FIG. 8 is immediately executed.

[Step 701] The frequency is raised by a predetermined value to decelerate the vibration wave motor.

[Step 702] Immediately after the driving frequency of the vibration wave motor is changed, the phase difference between the A- and S-phases becomes temporarily unstable. Thus, phase detection is stopped for a predetermined period of time.

[Step 703] After elapse of the predetermined period of time, when the state of the terminal IRQ0 is Lo, the flow returns to step 701 to repeat deceleration. When the state of the terminal IRQ0 is Hi, the interrupt processing is finished.

In the interrupt processing described above, the frequency is controlled such that the phase difference between the A- and S-phases is larger than a predetermined value (45° phase difference in the resonance state described above). Upon ending of the interrupt processing, the flow control by the microcomputer 1 returns to the step following the step in FIG. 6, FIG. 7A or FIG. 7B which was being executed when the interrupt processing was started. The flow resumes control from that state.

FIG. 8 shows the interrupt control flow for the motor 9. When it is detected that an input to the terminal IRQ1 is Lo, the flow in FIG. 8 is also executed to raise the frequency for the motor 39. In this case, since the flow is executed to control the motor 39, the terminals P11IN, D/A OUT1, Dir1, EN/DIS1, P4 to P7, and IRQ1 are selected as ports of the microcomputer 1 to execute the control flow in FIG. 8.

With the above arrangement, a process for a plurality of vibration wave motors itself is sequentially performed. However, when the phase difference of a vibration wave motor is smaller than a special value, interrupt processing is performed to prevent the vibration wave motor from deviating from the resonance frequency to be stopped. <Second Embodiment>

Figure 9:
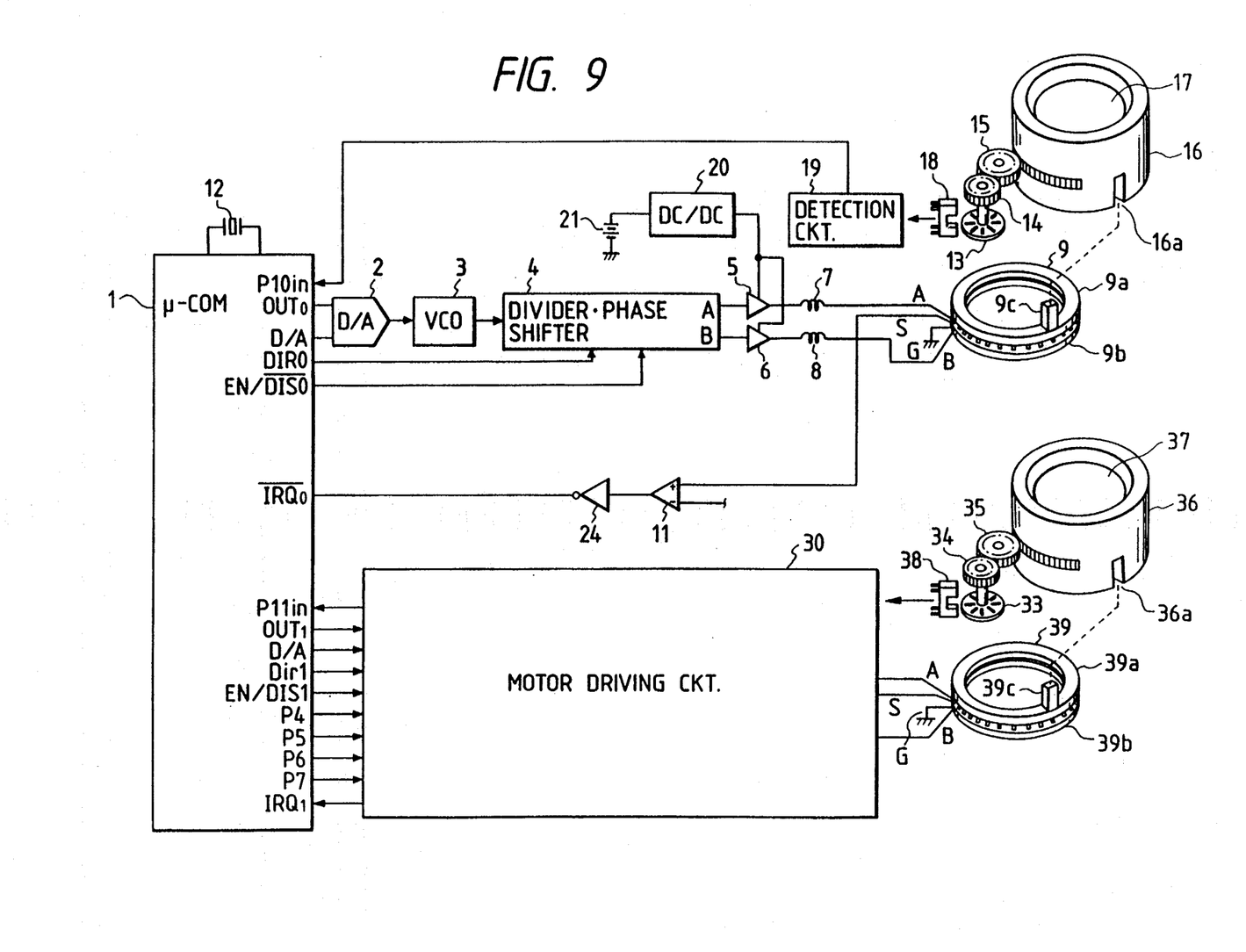
FIG. 9 is a schematic view showing the arrangement of a lens barrel having a driving control apparatus for a vibration wave motor according to the second embodiment of the present invention.

FIG. 9 is a view showing the second embodiment of the present invention, and a detailed description of the same parts as in FIG. 1 will be omitted.

An inverter 24 inverts the logic of an output from a comparator 11. More specifically, when the S-phase amplitude is larger than a predetermined comparison level, an output from the inverter 24 is Lo.

Figure 10:
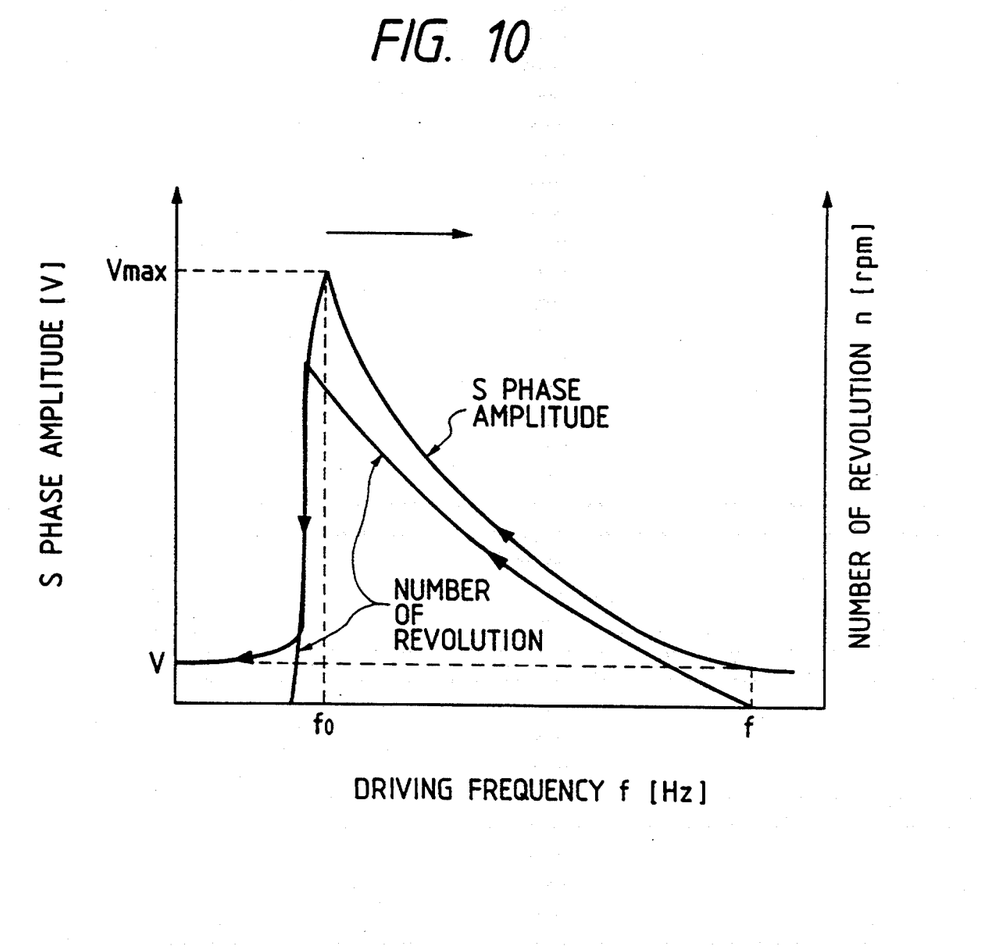
FIG. 10 is a graph showing the relationship between the amplitude of the vibration state detection signal for the vibration wave motor and the number of revolution of the motor.

FIG. 10 is a graph showing the driving frequency vs. S-phase signal amplitude characteristics and the driving frequency vs. number of revolutions characteristics of the vibration wave motor 9, in which a driving frequency f is plotted along the abscissa, an S-phase amplitude V is plotted along ordinate 1, and a number of revolutions n is plotted along ordinate 2.

Referring to FIG. 10, the S-phase amplitude is larger in the upward direction along the voltage axis, the number of revolutions n is higher in the upward direction, and the frequency f is higher in the right direction.

When the driving frequency is scanned from a high frequency to a lower frequency, the vibration wave motor starts to move at an initial frequency fs. As the frequency is further scanned to a lower frequency, the number of revolutions increases, and at the same time, the S-phase amplitude increases.

However, when the frequency is lowered below a resonance frequency fo, rotation of the motor suddenly stops, and the S-phase amplitude also greatly decreases. These characteristics are shifted in the left and right directions in accordance with the temperature and the load. Especially, when the load is heavy, the characteristics are shifted in the right direction in FIG. 10.

The function of the second embodiment will be described below with reference to FIG. 11.

Figure 11:
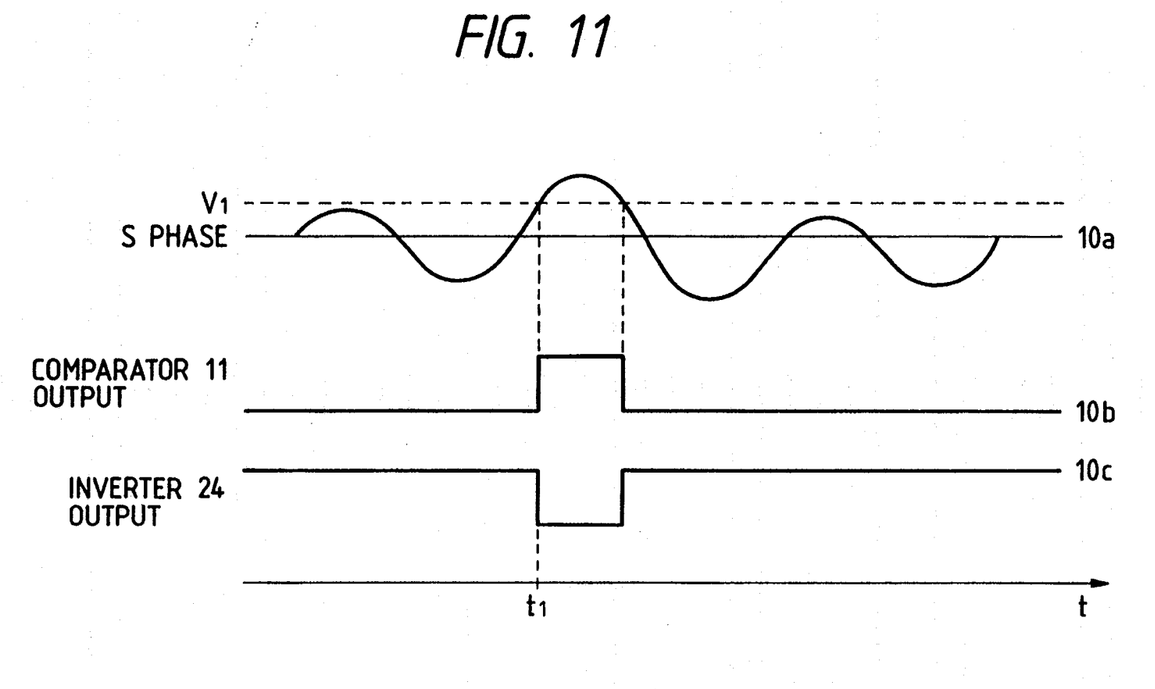
FIG. 11 is a timing chart of the vibration state detection signal for the vibration member of the vibration wave motor and the signal of the circuit of the driving control apparatus.

FIG. 11 shows an S-phase output 10a, and an output 10b from the comparator 11 in FIG. 9 representing a comparison result of the signal 10a.

FIG. 11 also shows an output 10c from the inverter 24, which is obtained by inverting the output from the comparator. At time t1 when the S-phase voltage exceeds a predetermined comparison level V1 and the inverter output goes Lo, an interrupt occurs in a microcomputer 1.

An operation programmed in the microcomputer 1 in the second embodiment will be described below with reference to FIG. 12.

[Step 1101] When the driving direction of the vibration wave motor is CCW (counterclockwise), a terminal DIR1 of the microcomputer 1 is set to Hi level. When the driving direction is CW (clockwise), the terminal DIRI is set to Lo level.

[Step 1102] A terminal D/A OUT0 of the microcomputer 1 is set to a value corresponding to the initial frequency fs.

[Step 1103] A terminal EN/DIS0 of the microcomputer 1 is set to Hi level to start driving of the vibration wave motor 9.

[Step 1104] When an output from the inverter 24 is Lo, the S-phase amplitude is larger than a predetermined value. In this case, the flow advances to step 1107 to decelerate the vibration wave motor. When an output from the inverter 24 is Hi, the flow advances to step 1105 to accelerate the vibration wave motor.

[Step 1105] The interval of a pulse generated by rotation of a pulse plate 13 is measured. When the pulse width is smaller than a predetermined value, the flow advances to step 1107 to decelerate the vibration wave motor. When the pulse width is larger than the predetermined value, the flow advances to step 1106 to accelerate the vibration wave motor to a target speed.

[Step 1106] The frequency is lowered by a predetermined value to accelerate the vibration wave motor. The flow jumps to step 1108.

[Step 1107] The frequency is raised by a predetermined value to decelerate the vibration wave motor.

[Step 1108] The number of pulses of the interrupter, which are input to an input terminal P10in of the microcomputer 1, is counted. When the count value has not reached a driving target value, the flow returns to step 1105. When the count value has reached the driving target value, the flow advances to step 1109.

[Step 1109] The output terminal EN/DIS0 of the microcomputer 1 is set to Lo level to end driving of the vibration wave motor.

Steps 1101 to 1109 described above are related to the driving process of the vibration wave motor 9. However, a plurality of vibration wave motors 9 and 39 are controlled by sequentially repeating steps 1105 to 1108. More specifically, in the same flow as in FIG. 7 described above, the motors 9 and 39 are alternately controlled. The flow shown in FIGS. 6 and 7 and the flow in this embodiment are different only in the following point. In the first embodiment in FIGS. 6 and 7, interrupt processing is performed when the phase difference becomes smaller than a predetermined value. On the other hand, in this embodiment, interrupt processing is performed when the S-phase amplitude becomes larger than a predetermined value.

Interrupt processing performed when the S-phase amplitude becomes larger than a predetermined value will be described below with reference to FIG. 13.

[Step 1201] The frequency is raised by a predetermined value to decelerate the vibration wave motor.

[Step 1202] Immediately after the driving frequency of the vibration wave motor is changed, the S-phase amplitude becomes temporarily unstable. Thus, phase detection is stopped for a predetermined period of time.

[Step 1203] After elapse of the predetermined period of time, when the state of the terminal IRQ0 is Lo, the flow returns to step 1201 to repeat deceleration. When the state of the terminal IRQ0 is Hi, the interrupt processing is finished.

Figures 12, 13:
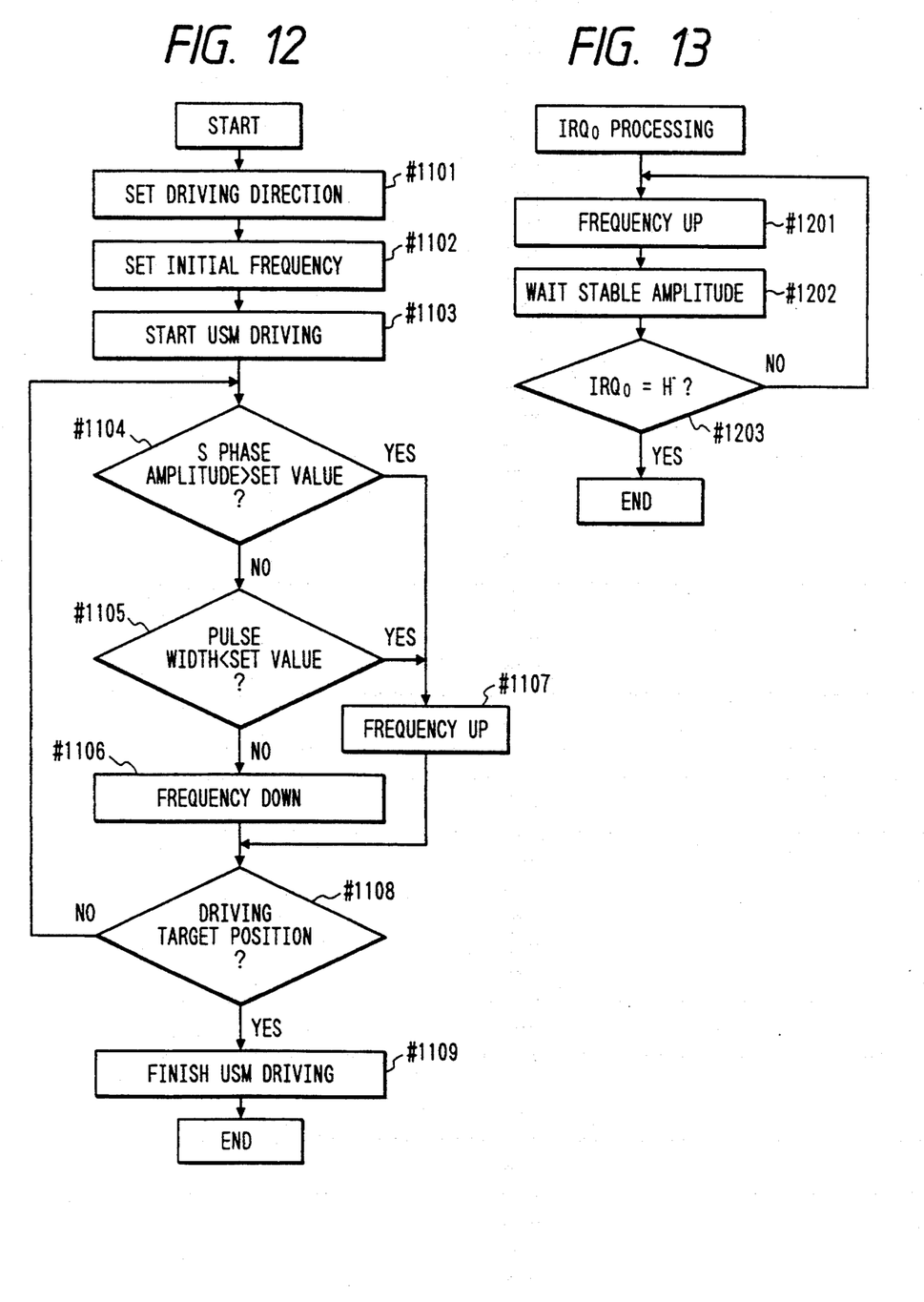
FIG. 12 is a flow chart showing the control operation of the driving control apparatus for the vibration wave motor according to the second embodiment.
FIG. 13 is a flow chart showing the characteristic control operation in the driving control apparatus for the vibration wave motor according to the second embodiment.

FIG. 13 shows the control flow for the motor 9. However, as in the first embodiment, when an input to the terminal IRQ1 of the microcomputer is Lo, the flow in FIG. 13 is executed as a control flow for the motor 39.

In the first embodiment, as a timing of interrupt processing, when the phase difference becomes smaller than a phase difference corresponding to a 45° phase difference in the resonance state, interrupt processing is performed. However, interrupt processing may be performed when the phase difference becomes a little larger than the phase difference in the resonance state, e.g., a 50° phase difference in a state near resonance.

What is claimed is:

1. A control apparatus for controlling a plurality of vibration driven actuators, comprising:
   a control circuit for sequentially and repeatedly performing an operation control process for each of a plurality of simultaneously driven vibration driven actuators.;
   a plurality of detection circuits for detecting respective operation states of the plurality of vibration driven actuators, and for generating respective output signals corresponding to the respective operation states of the plurality of vibration driven actuators; and
   interrupt processing means responsive to the respective output signals of said plurality of detection circuits, for causing said control circuit to perform with priority an operation control process for a respective one of the plurality of vibration driven actuators in accordance with a respective output signal from a respective detection circuit.

2. An apparatus according to claim 1, wherein each detection circuit detects whether the operation state of a respective vibration driven actuator is in a resonance state or a state near resonance.

3. An apparatus according to claim 1, wherein, in response to a respective output signal from a respective detection circuit, said interrupt processing means causes said control circuit to adjust a driving frequency of a periodic signal applied to the respective vibration driven actuator to inhibit the driving frequency from becoming lower than a predetermined frequency.

4. An apparatus according to claim 3, wherein each detection circuit detects whether a respective vibration driven actuator is in a resonance state or a state near resonance, and said interrupt processing means is actuated when said respective vibration driven actuator is in a resonance state or a state near resonance.

5. An apparatus according to claim 1, wherein each vibration driven actuator is a vibration motor which obtains a driving force when a vibration member is vibrated by applying a periodic signal to an electromechanical energy converting element arranged on the vibration member.

6. An apparatus according to claim 4, wherein each vibration driven actuator is a vibration motor which obtains a driving force when a vibration member is vibrated by applying a periodic signal to an electromechanical energy converting element arranged on the vibration member.

7. A control apparatus for controlling a plurality of simultaneously driven vibration driven motors, comprising:
   a plurality of detection circuits for detecting respective driven states of the plurality of vibration driven motors and for generating respective output signals when the detected driven state of a respective one of the plurality of vibration driven motors is in a predetermined state; and
   a processing circuit having a program for selectively performing a predetermined sequence of control processes for the plurality of vibration driven motors, each of the control processes being performed for each of the plurality of vibration driven motors, said processing circuit performing interrupt processing for a respective one of the plurality of vibration driven motors in accordance with a respective output signal from a respective detection circuit.

8. An apparatus according to claim 7, wherein the interrupt processing inhibits a frequency of a periodic signal applied to said respective one of the plurality of vibration driven motors from being reduced.

9. An apparatus according to claim 7, wherein the interrupt processing shifts a frequency of a periodic signal applied to said respective one of the plurality of vibration driven motors in a direction of a higher frequency.

* * * * *

UNITED STATES PATENT AND TRADEMARK OFFICE
CERTIFICATE OF CORRECTION

PATENT NO. : 5,440,212

DATED : August 8, 1995

INVENTOR(S) : Fukui

Page 1 of 2

It is certified that error appears in the above-indentified patent and that said Letters Patent is hereby corrected as shown below:

Title page,

At [56] FOREIGN PATENT DOCUMENTS

"0258510 2/1990 Japan." should read --2-58510 2/1990 Japan.--.

Column 1

Line 27, "feed" should read --feeding--.

Column 2

Line 54, "<First" should read --¶ <First--.

Column 3

Line 19, "(=)" should read --(=360°/32)--; and
Line 51, "generate" should read --generates--.

Column 7

Line 32, "<Second" should read --¶ <Second--.

UNITED STATES PATENT AND TRADEMARK OFFICE
CERTIFICATE OF CORRECTION

PATENT NO. : 5,440,212
DATED : August 8, 1995
INVENTOR(S) : Fukui

It is certified that error appears in the above-indentified patent and that said Letters Patent is hereby corrected as shown below:

Column 9

Line 27, "actuators.;" should read --actuators;--.

Signed and Sealed this

Twenty-first Day of November, 1995

Attest:

BRUCE LEHMAN

Attesting Officer

Commissioner of Patents and Trademarks